Feb. 16, 1926.
A. C. WEBSTER
1,573,531
SCREW THREADED ATTACHING DEVICE
Filed March 9, 1925
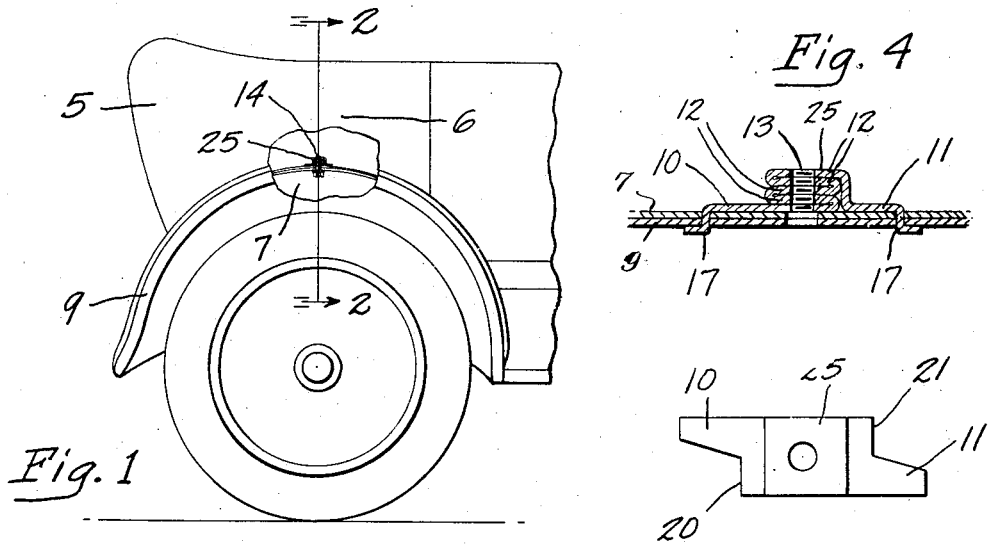
INVENTOR
ARVIN C. WEBSTER
BY
ATTORNEY Patented Feb. 16, 1926.

1,573,531

UNITED STATES PATENT OFFICE.

ARVIN C. WEBSTER, OF DETROIT, MICHIGAN.

SCREW-THREADED ATTACHING DEVICE.

Application filed March 9, 1925. Serial No. 14,035.

*To all whom it may concern:*

Be it known that I, ARVIN C. WEBSTER, a citizen of the United States, and resident of the city of Detroit, county of Wayne, and State of Michigan, have invented certain new and useful Improvements in Screw-Threaded Attaching Devices, of which the following is a specification, reference being had to the accompanying drawings.

It is the primary object of my invention to provide a simple and economical device for detachably joining sheet metal pieces together.

It frequently occurs in various constructions that adjoining edges of sheet metal pieces are desired to be detachably secured together, and some difficulty in doing this has been experienced. This is particularly true in the securing of rear fenders to the wheel housing portion of automobile bodies, as well as various other parts of automobile bodies, where one side only of the metal is accessible to the person assembling. The logical manner of securing such pieces together would be by screws or studs and because of the thinness of the metal it becomes necessary that some screw threaded attachment be employed into which the screw or stud may pass. It has been common practice to utilize cast lugs or securing elements for this purpose, and my invention contemplates the use of strips of sheet metal bent upon themselves to secure a final thickness sufficient for use in screw threading.

With the above and other objects in view, my invention consists in the arrangement, combination and construction of the various parts of my improved device, as described in the specification, claimed in my claims and shown in the accompanying drawings, in which:

Fig. 1 is a side elevation with certain parts cut away showing the assembly of a rear fender of an automobile wherein my improved device is employed.

Fig. 2 is a sectional view taken on line 2—2 of Fig. 1.

Fig. 3 is a slight modification of the view shown in Fig. 2.

Fig. 4 is a sectional view taken on line 4—4 of Fig. 2.

Fig. 5 is a top or plan view of my attaching device.

I have shown an automobile body, indicated generally as 5, which is provided with a rear wheel housing portion consisting of vertically extending sections 6 and 7, with an intermediate horizontal section 8. I have also shown a rear fender 9, such as is usually employed and secured to or adjacent the horizontal portion 8 of the wheel housing. Secured on the horizontal portion 8 in Fig. 2 and on the vertical portion 7 in Fig. 3, on the inner side thereof, I have shown my improved securing device which consists of a strip of metal having end portions 10 and 11 adapted to bear against the inner side of the housing, and a plurality of return bends 12 intermediate the end portions 10 and 11, so as to effect a thickened portion 25, which portion is provided with screw threads 13, into which a screw or stud 14 is threaded with the head 15 thereof bearing against a lock washer 16. The screw or stud 14 extends through aligned apertures in the inside edge of the fender 9 and in the wheel housing, the lock washer 16 bearing against the outside surface of the fender 9. The end portions 10 and 11 may be secured to the inner surface of the wheel housing by welding, riveting or the like, but as an additional method of securing the same, I have shown downwardly bent lugs 17 on the ends of the end portions 10 and 11, which extend through apertures in the wheel housing for securing the same in place.

As shown in Fig. 5, the end portions 10 and 11 are cut on an angle which removes a portion of the metal from the ends constituting the original width of the strip. This makes possible the cutting of a larger number of strips from a given length of metal for the reason that the beginning of the following strip will be at the points 20 and 21. A saving of approximately one inch of metal for each device is effected by this practice.

It will thus be seen that I have provided a simple and economical device by which screws or studs may be utilized for securing over-lapping pieces of relatively thin metal together, so that the securing means may be readily removed from the free side thereof, and I desire to point out that my improved securing device is not limited to the securing of fenders to rear wheel housings, but may be utilized in various other capacities.

It will be obvious therefore that various changes may be made in the arrangement, combination and construction of the various parts of my improved device without departing from the spirit of my invention, and it is my intention to cover by my claims such changes as may be reasonably included within the scope thereof.

What I claim is:

1. In combination, two sheet metal members having aligned apertures therein, a securing fitting consisting of a strip of sheet metal having ends secured to one of said members and having an intermediate thickened portion formed by bending the intermediate portion of the strip upon itself, a screw threaded opening in said thickened portion and a screw extending through all of said openings with its head abutting the other said member, for securing said members together.

2. A combination as set forth in claim 1 wherein apertures are provided in said first member adjacent the ends of said fitting and lugs are struck from said ends, extended through said apertures and bent, to secure the fitting to the member.

ARVIN C. WEBSTER.